United States Patent
Lin et al.

(10) Patent No.: US 12,047,008 B2
(45) Date of Patent: Jul. 23, 2024

(54) FLYBACK POWER CONVERTERS AND CONTROL METHODS THEREOF

(71) Applicant: Leadtrend Technology Corporation, Zhubei (TW)

(72) Inventors: Tzu Chen Lin, Zhubei (TW); Ming-Chang Tsou, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 90 days.

(21) Appl. No.: 18/065,253

(22) Filed: Dec. 13, 2022

(65) Prior Publication Data
US 2024/0154532 A1   May 9, 2024

(30) Foreign Application Priority Data
Nov. 4, 2022   (TW) .................................. 111142257

(51) Int. Cl.
*H02M 3/335* (2006.01)
*H02M 1/00* (2006.01)

(52) U.S. Cl.
CPC ..... *H02M 3/33569* (2013.01); *H02M 1/0095* (2021.05); *H02M 3/33507* (2013.01); *H02M 3/33515* (2013.01); *H02M 3/33523* (2013.01)

(58) Field of Classification Search
CPC ......... H02M 3/33507; H02M 3/33523; H02M 3/33515; H02M 3/33561; H02M 3/33569
See application file for complete search history.

(56) References Cited

U.S. PATENT DOCUMENTS

| | | | | |
|---|---|---|---|---|
| 9,917,523 | B1* | 3/2018 | Lu | H02M 3/18 |
| 2005/0174811 | A1* | 8/2005 | Liu | H02M 3/33592 |
| | | | | 363/21.01 |
| 2015/0357924 | A1* | 12/2015 | Lin | H02M 3/33507 |
| | | | | 363/21.18 |
| 2016/0285376 | A1* | 9/2016 | Tsou | H02M 3/33523 |
| 2020/0036290 | A1* | 1/2020 | Yang | H02M 3/24 |
| 2020/0195132 | A1* | 6/2020 | Tsou | H02M 3/33515 |
| 2021/0281166 | A1* | 9/2021 | Tsou | H02M 1/0032 |

\* cited by examiner

*Primary Examiner* — Gary A Nash
(74) *Attorney, Agent, or Firm* — McClure, Qualey & Rodack, LLP (57) ABSTRACT

A control method in use of a flyback power converter is disclosed to provide an operation power source supplying power to a power controller controlling a main power switch. The flyback power converter has a transformer with a primary winding and an auxiliary winding. The main power switch and the primary winding are connected in series. A chopper switch and a buffer inductor are connected in series between the auxiliary winding and the power controller. The power controller turns ON the main power switch for an ON time to energize the transformer, and turns ON the chopper switch for at least a time period during the ON time, so that during the time period the buffer inductor conducts an induced current flowing from the auxiliary winding and through the chopper switch, to build up the operation power source.

14 Claims, 7 Drawing Sheets

FLYBACK POWER CONVERTERS AND CONTROL METHODS THEREOF

CROSS-REFERENCE TO RELATED APPLICATION

This application claims priority to and the benefit of Taiwan Application Series Number 111142257 filed on Nov. 4, 2022, which is incorporated by reference in its entirety.

BACKGROUND

The present disclosure relates generally to flyback power converters, and more particularly to control methods and flyback power converters in which a capacitor supplying an operation power source is charged during an ON time of a main power switch.

Flyback power converters are simple in view of structure topology, and are widely adopted by manufactures of power supplies. A flyback power converter is capable of providing galvanic isolation between a mains power in a primary side and an output power in a secondary side, and at the same time sustaining the output voltage which could vary in a very broad range.

A power supply for supplying power to an USB (universal series bus) port may be implemented by a flyback power converter. USB PD (power delivery), a specification defined by USB-IF (USB Implementers Forum), offers increased power levels with different voltages, which could be as low as 5V or as high as 20V. In other words, the output voltage of a power supply complying with USB PD could be down to 5V or up to 20V, a 4-time variation range. Even though this 4-time variation range could be supported by a flyback power converter, it nevertheless introduces challenges to some circuits that support the flyback power converter.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
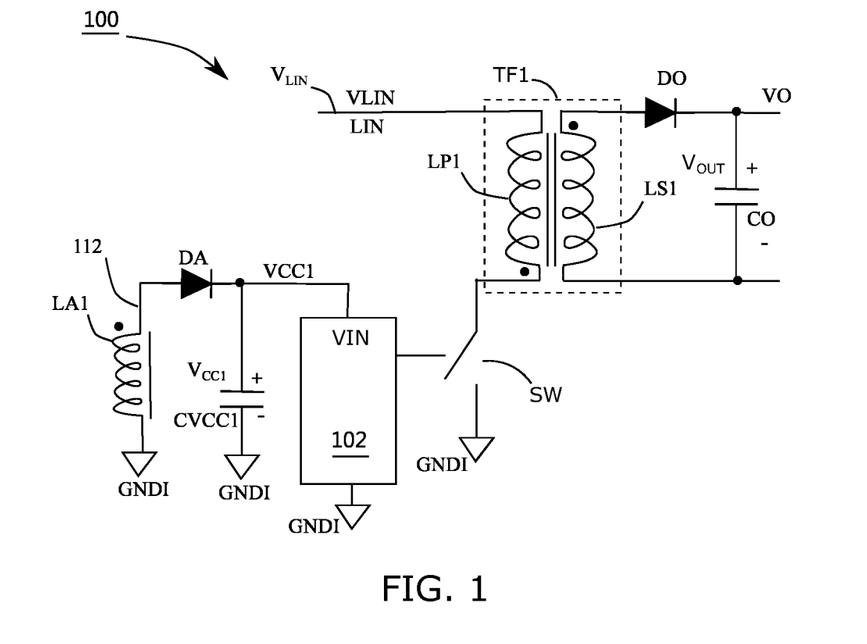
FIGS. 1 and 2 demonstrate two flyback power converters.

FIG. 1 demonstrates flyback power converter 100. Connected in series between input power line LIN and input ground line GNDI are primary winding LP1 and main switch SW. Transformer TF1 has primary winding LP1, secondary winding LS1 and auxiliary winding LA1, inductively coupled to each other. When main power switch SW is turned ON, providing a short circuit, input power source VLIN at input power line LIN energizes primary winding LP1 by increasing its electromagnetic energy, equivalently increasing the electromagnetic energy stored by transformer TF1. When main power switch SW is turned OFF, providing an open circuit, the electromagnetic energy that transformer TF1 stores may be released from secondary winding LS1 to build up output power source VO with output voltage $V_{OUT}$. Accordingly, flyback power converter 100 converts input power source VLIN at input power line LIN into output power source VO across the two terminals of output capacitor CO. Input power line LIN and input ground line GNDI in some embodiments of the invention are two outputs of a bridge rectifier providing full wave rectification. To comply with USB PD, output voltage $V_{OUT}$ in FIG. 1 could be switched from being regulated at 5V to being regulated at 20V. In other words, flyback power converter 100 is required to support 4-time output voltage variation range.

It can be derived from FIG. 1 that when secondary winding LS1 is outputting current to charge output capacitor CO, the voltage drop across secondary winding LS1 is about output voltage $V_{OUT}$, and operation power source voltage $V_{CC1}$, the voltage of operation power source VCC1 for power controller 102, is substantially proportional to output voltage $V_{OUT}$. Apparently, if output voltage $V_{OUT}$ increases by 4 times, operation power source voltage $V_{CC1}$ will increase by 4 times.

In FIG. 1, capacitor CVCC1 stores energy to provide operation power source VCC1 with operation power source voltage $V_{CC1}$, and, through power node VIN, operation power source VCC1 supplies power that power controller 102 needs for normal operation. Operation power source voltage $V_{CC1}$ is commonly required to be 12V at least, so power controller 102 can turn ON main power switch SW effectively and properly. Therefore, 12V is commonly the minimum value of operation power source voltage $V_{CC1}$, happening when output voltage $V_{OUT}$ is about 5V for example. Nevertheless, operation power source voltage $V_{CC1}$ increases by 4 time, up to about 48V, when output voltage $V_{OUT}$ is switched to be regulated at 20V according to USB PD. It means that power node VIN of power controller 102 in FIG. 1 need withstand 48V, and as a result the process of manufacturing power controller 102 is considerably expensive.

Figure 2:
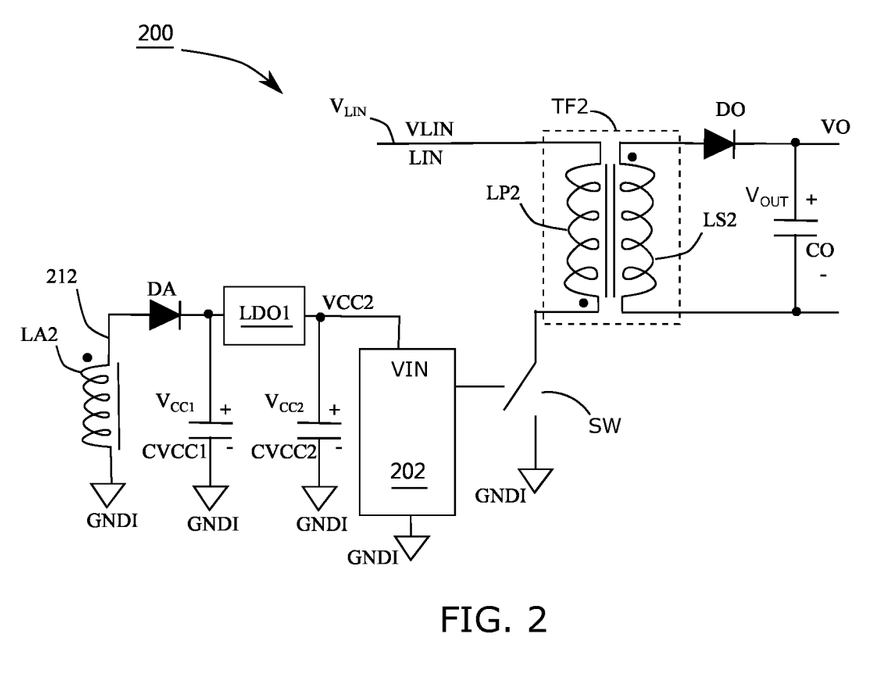

To reduce the manufacture cost of power controller 102 in FIG. 1, FIG. 2 demonstrates that low dropout LDO1 is inserted between auxiliary winding LA2 and power node VIN of power controller 202, in consideration that operation power source voltage $V_{CC2}$ of operation power source VCC2 could be constrained. For example, low dropout LDO1 can limit operation power source voltage $V_{CC2}$ to be less than 20V, so power controller 202, which only need withstand 20V input, can be manufactured by a less expensive semiconductor process. Nevertheless, low dropout LDO1 consumes a lot of electric energy especially when the voltage drop between its input and its output is very high. Most likely, low dropout LDO1 deteriorates the conversion efficiency of flyback power converter 200 seriously when output voltage $V_{OUT}$ is regulated at 20V.

Figure 3:
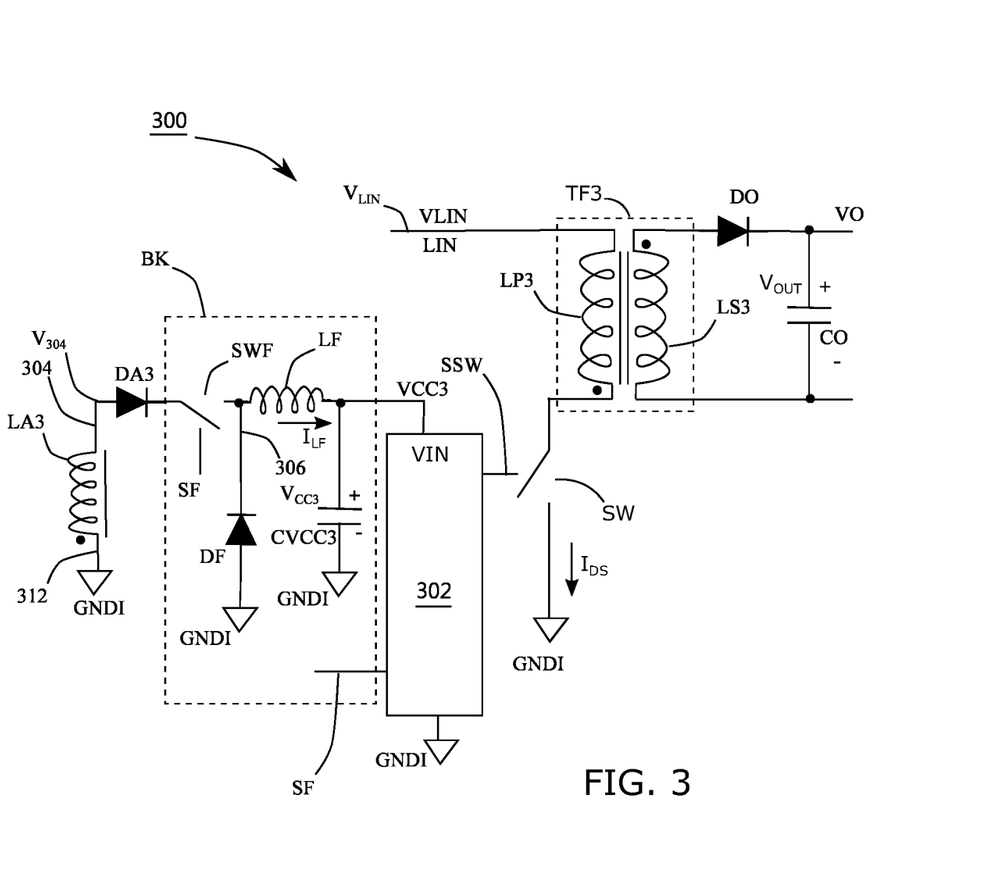
FIG. 3 demonstrates a flyback power converter according to embodiments of the invention.

FIG. 3 demonstrates flyback power converter 300 according to embodiments of the invention. Flyback power converter 300 has similar or the same parts or devices with flyback power converters 100 and 200 in FIGS. 1 and 2, and they might not be detailed further because they are comprehensible in view of the previous teachings related to FIGS. 1 and 2. Each of primary windings LP1, LP2 and LP3 in FIGS. 1, 2 and 3 has its positive terminal, the end not marked with a dot, connected to input power line LIN. Each of auxiliary windings LA1 and LA2 has its positive terminal, the end marked with a dot, connected to input ground line GNDI. Unlike auxiliary windings LA1 and LA2 in FIGS. 1 and 2, auxiliary winding LA3 of transformer TF3 in flyback power converter 300 has different polarity. Negative terminal 112/212 of auxiliary winding LA1/LA2, connects to rectifier diode DA, but negative terminal 312 of auxiliary winding LA3 connects to input ground line GNDI.

From positive terminal 304 of auxiliary winding LA3 to power node VIN of power controller 302, connected in series are rectifier diode DA3, chopper switch SWF and buffer inductor LF. Freewheeling diode DF is connected between input ground line GNDI and joint 306 that connects chopper switch SWF and buffer inductor LF. Capacitor CVCC3 stores energy to provide operation power source VCC3 with operation power source voltage $V_{CC3}$, and, through power node VIN, operation power source VCC3 supplies power that power controller 302 needs for normal operation. Power controller 302 generates driving signal SSW and control signal SF to control main power switch SW and chopper switch SWF respectively.

Chopper switch SWF, freewheeling diode DF and buffer inductor LF in combination form buck converter BK, to charge capacitor CVCC3 and build up operation power source VCC3 with operation power source voltage $V_{CC3}$. The input power source of buck converter BK is from rectifier diode DA3, which rectifies induced voltage $V_{304}$ at positive terminal 304 of auxiliary winding LA3. Only if induced voltage $V_{304}$ exceeds operation power source voltage $V_{CC3}$, the input power source of buck converter BK is ready for buck converter BK to supply power to capacitor CVCC3.

FIGS. 4A to 4D show waveforms of signals in FIG. 3 when flyback power converter 300 operates in modes M1 to M4 respectively. From top to bottom, the waveforms in each of FIGS. 4A to 4D are driving signal SSW provided to main power switch SW, induced voltage $V_{304}$ at positive terminal 304, detection current $I_{DS}$ flowing through main power switch SW, electromagnetic energy H stored in transformer TF3, inductor current $I_{LF}$ that buffer inductor LF conducts, and control signal SF provided to chopper switch SWF.

Figure 4A:
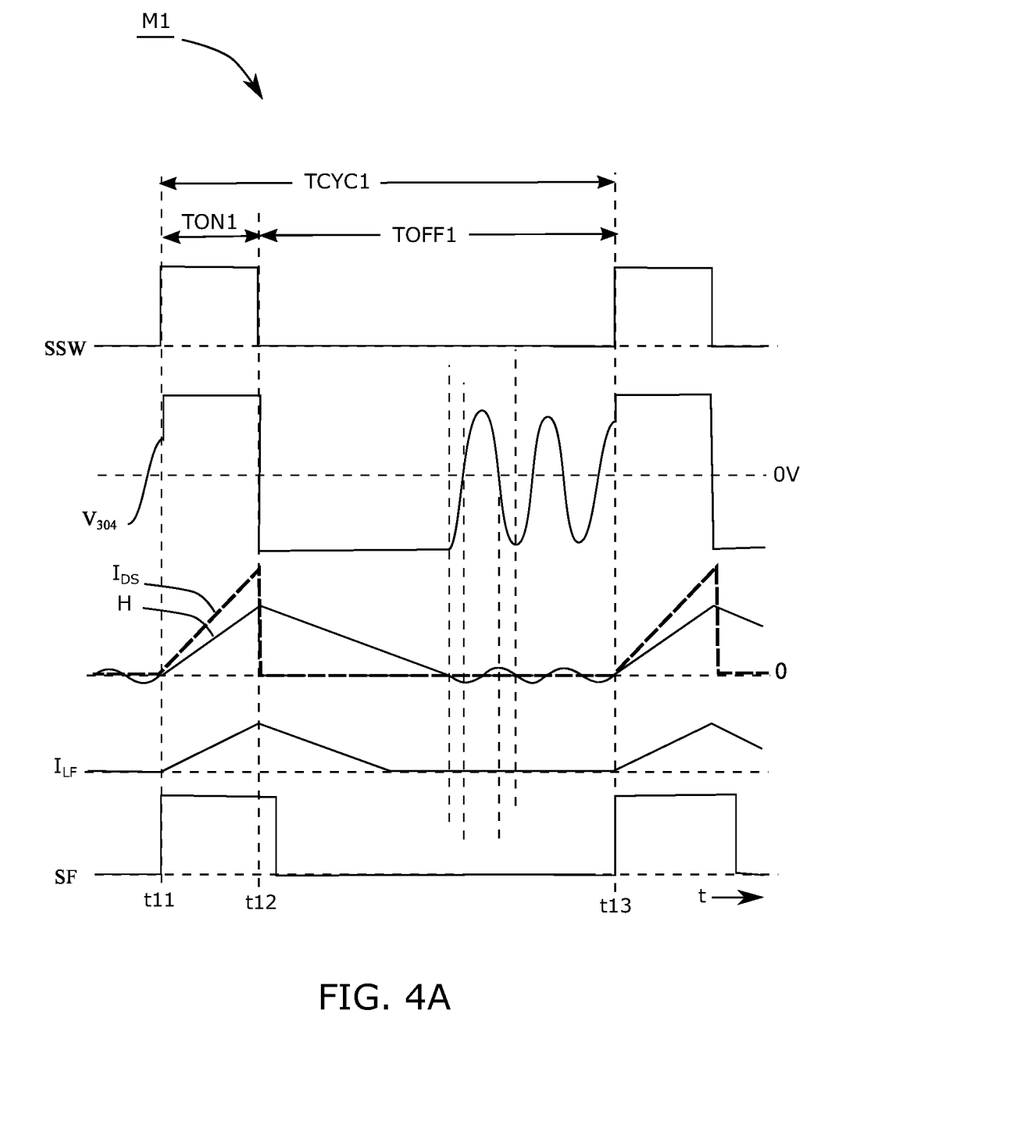
FIGS. 4A to 4D show waveforms of signals in FIG. 3 when flyback power converter 300 operates in modes M1 to M4 respectively.

Switching cycle TCYC1 in FIG. 4A demonstrates operation mode M1, showing how capacitor CVCC3 is charged to build up operation power source VCC3. Driving signal SSW turns ON and OFF main power switch SW at moments t11 and t12 respectively, defining the period from moment t11 to moment t12 as ON time TON1. Driving signal SSW at moment t13 turns ON main power switch SW again to conclude switching cycle TCYC1, and the period from moment t12 to moment t13 is defined as OFF time TOFF1. As demonstrated by the waveform of control signal SF in FIG. 4A, chopper switch SWF is kept ON during ON time TON1, and is turned OFF at moment t12 or at another predetermined moment after moment t12.

During ON time TON1, induced voltage $V_{304}$ is positive, having a voltage value reflecting the voltage drop across primary winding LP3, while this voltage drop is about voltage $V_{LIN}$ of input power source VLIN. For instance, it is supposed that the numbers of turns of primary winding LP3, secondary winding LS3, and auxiliary winding LA3 are NP3, NS3 and NA3 respectively. Induced voltage $V_{304}$ should be at a value of $V_{LIN}$*NA3/NP3 during ON time TON1.

During ON time TON1, induced voltage $V_{304}$ is higher than operation power source voltage $V_{CC3}$, and chopper switch SWF is ON, so buck converter BK drains electric current from auxiliary winding LA3 to charge capacitor CVCC3 and to increase at the same time the electromagnetic energy that buffer inductor LF stores. Therefore, as time goes by, inductor current $I_{LF}$ increases. In other words, during ON time TON1, input power source VLIN supplies power to charge capacitor CVCC3 and build up operation power source VCC3, via the network including transformer TF3, rectifier diode DA3, chopper switch SWF and buffer inductor LF.

During ON time TON1, input power source VLIN supplies both the power that buck converter BK drains from auxiliary winding LA3 and the power that energizes transformer TF3 from primary winding LP3. Therefore, as shown in FIG. 4A, both detection current $I_{DS}$ and electromagnetic energy H increase linearly over time. Both transformer TF3 and buffer inductor LF are energized during ON time TON1, for each of them stores more electromagnetic energy as time goes by during ON time TON1. In consideration of clear explanation, waveforms of detection current $I_{DS}$ and electromagnetic energy H are aligned to each other in FIG. 4A, and the amount by which detection current $I_{DS}$ exceeds electromagnetic energy H is proportional to inductor current $I_{LF}$. For instance, inductor current $I_{LF}$ is about $(I_{DS}-H)$*NP3/NA3.

At the beginning of OFF time TOFF1, the voltage drop across secondary winding LS3 is clamped by output voltage $V_{OUT}$, and electromagnetic energy H is released to output capacitor CO from secondary winding LS3. In the meantime, the electromagnetic energy stored in buffer inductor LF is also released to capacitor CVCC3, so inductor current $I_{LF}$ flows through freewheeling diode DF and buffer inductor LF to charge capacitor CVCC3. Therefore, as shown in FIG. 4A, both electromagnetic energy H and inductor current $I_{LF}$ decrease overtime at the beginning portion of OFF time TOFF1.

During OFF time TOFF1, detection current $I_{DS}$ remains OA as main power switch SW is turned OFF.

Shown in FIG. 4A, during OFF time TOFF1, induced voltage $V_{304}$ turns to be negative in the beginning, reflecting the voltage drop across secondary winding LS3, which is about output voltage $V_{OUT}$. For instance, in the beginning of OFF time TOFF1, induced voltage $V_{304}$ remains at $-V_{OUT}*NA3/NS3$. After electromagnetic energy H is depleted, becoming 0A, a resonant circuit consisting of transformer TF3 and some peripheral parasitic capacitors starts to resonate. So both electromagnetic energy H and induced voltage $V_{304}$ vibrate until the start of a next switching cycle, as shown in FIG. 4A.

Inductor current $I_{LF}$ increases during ON time TON1 and decreases during OFF time TOFF1 until it becomes 0A. Inductor current $I_{LF}$ charges capacitor CVCC3 to increase or maintain operation power source voltage $V_{CC3}$.

Figure 4B:
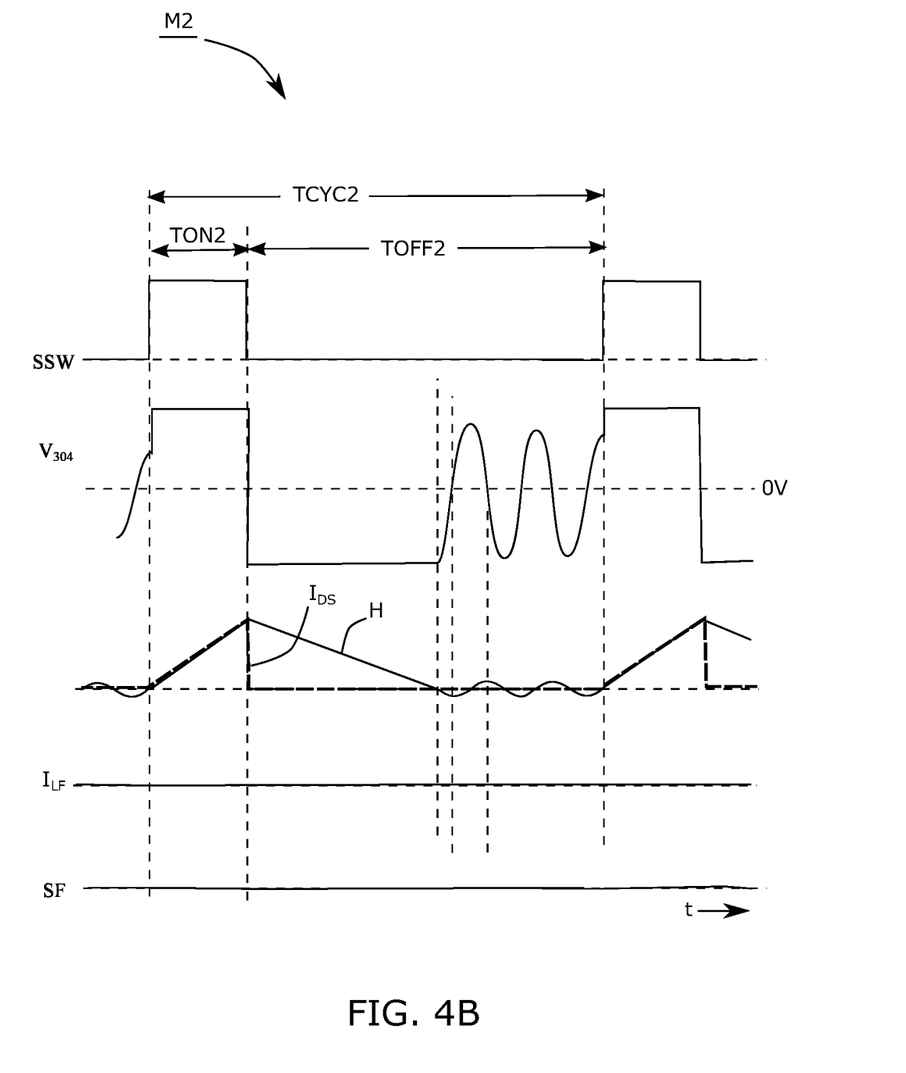

Switching cycle TCYC2 in FIG. 4B demonstrates operation mode M2, showing how capacitor CVCC3 is not charged. Different to what happens during switching cycle TCYC1, chopper switch SWF is constantly turned OFF during switching cycle TCYC2 as control signal SF is always at logic "0". Therefore, inductor current ILE is always 0A during switching cycle TCYC2, as shown in FIG. 4B. It also results in that detection current $I_{DS}$ is equal to electromagnetic energy H during ON time TON2 in FIG. 4B.

Figure 4C:
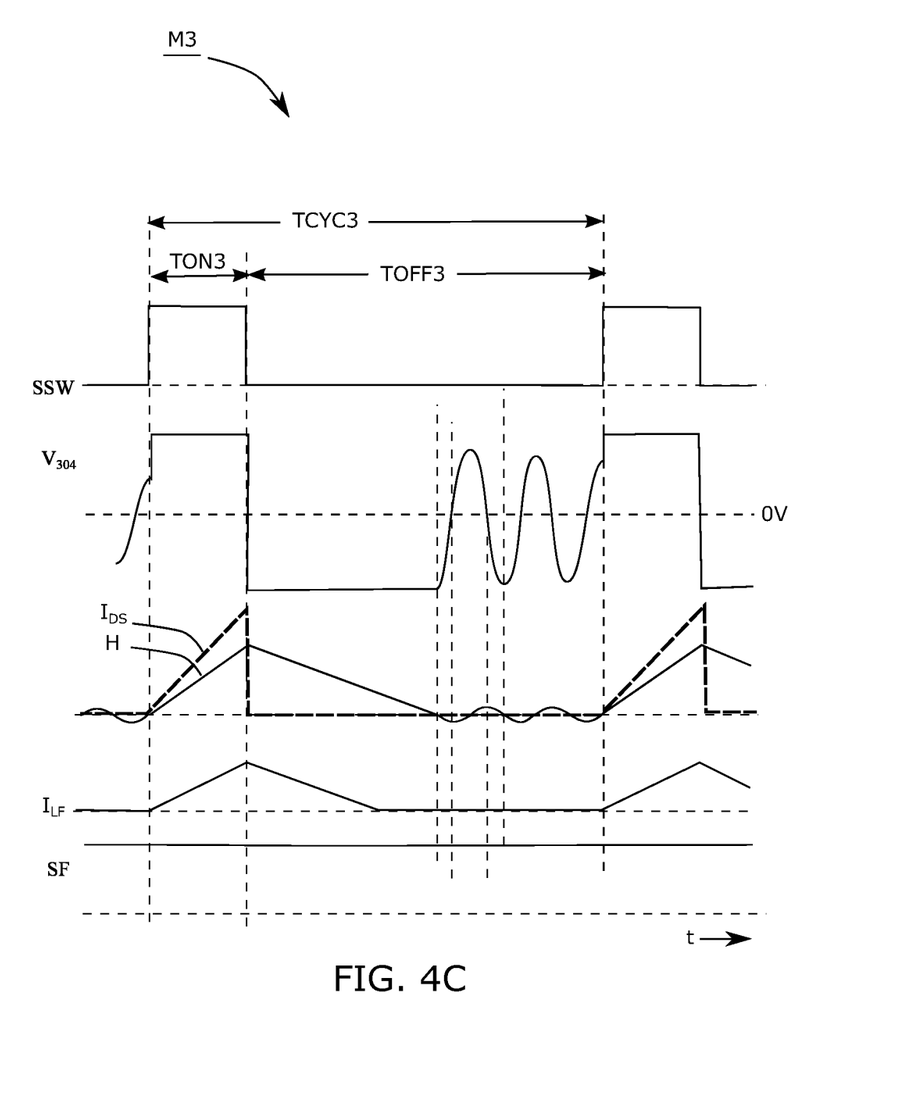

Switching cycle TCYC3 in FIG. 4C demonstrates operation mode M3, showing how capacitor CVCC3 is charged to build up operation power source VCC3. Chopper switch SWF is constantly turned ON during the whole switching cycle TCYC3 as control signal SF is always at logic "1". Since induced voltage $V_{304}$ is higher than operation power source voltage $V_{CC3}$ during ON time TON3, the waveforms of detection current $I_{DS}$ and induced current $I_{LF}$ in FIG. 4C are the same with their corresponding ones during switching cycle TCYC1 in FIG. 4A.

Figure 4D:
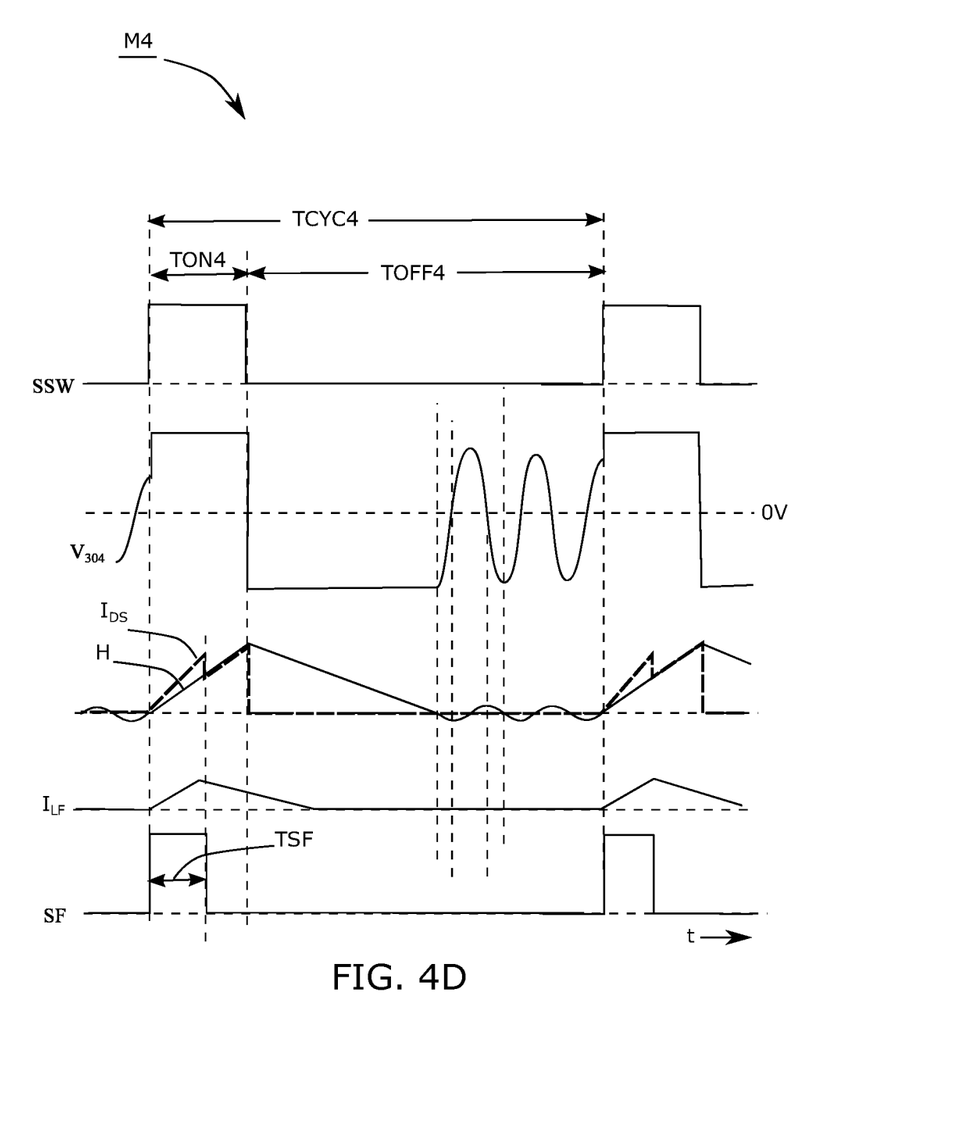

Switching cycle TCYC4 in FIG. 4D demonstrates operation mode M4, showing that chopper switch SWF is turned ON during a portion of ON time TON4. Shown in FIG. 4D, pulse width TSF of control signal SF, which represents the ON time of chopper switch SWF, is narrower than ON time TON4. Right after chopper switch SWF is turned OFF, inductor current $I_{LF}$ starts ramping down from a peak and detection current $I_{DS}$ soon becomes equal to electromagnetic energy H.

Power controller 302 controls chopper switch SWF in response to operation power source voltage $V_{CC3}$ on capacitor CVCC3.

Figure 5:
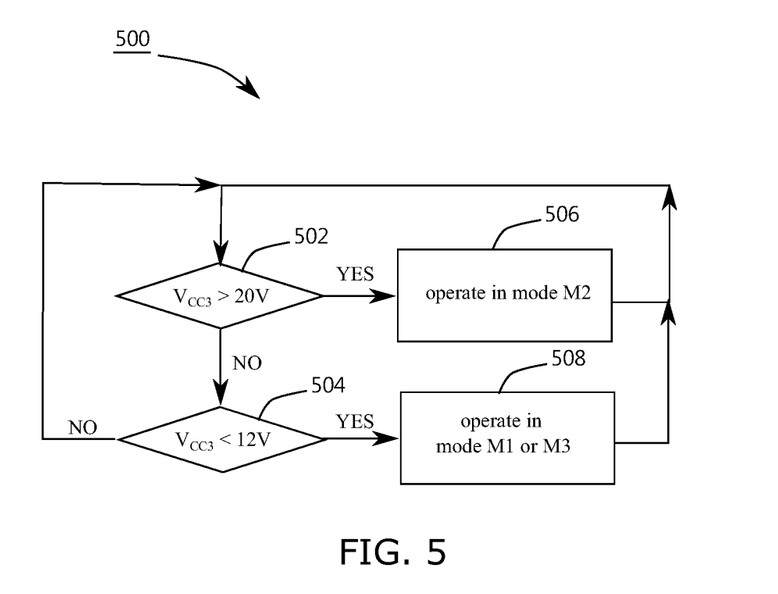
FIGS. 5 and 6 show control methods in use of a power controller according to embodiments of the invention.

According to some embodiments of the invention, power controller 302 can employ operation modes M1-M3 to roughly control operation power source voltage $V_{CC3}$. FIG. 5 shows control method 500 in use of power controller 302. At step 502, power controller 302 compares operation power source voltage $V_{CC3}$ with 20V, for example. Step 506 follows if operation power source voltage $V_{CC3}$ exceeds 20V, to operate in operation mode M2 and to stop charging capacitor CVCC3. According, operation power source voltage $V_{CC3}$ ramps down as its power is consumed over time. At step 504, power controller 302 compares operation power source voltage $V_{CC3}$ with 12V, for example. Step 508 follows if operation power source voltage $V_{CC3}$ is below 12V, to operate in operation mode M1 or M3 and to charge capacitor CVCC3 during ON time TON1 or TON3. If operation power source voltage $V_{CC3}$ is determined to be between 12V and 20V, power controller 302 could operate in anyone of operation modes M1-M3. In one embodiment of the invention, operation mode M1 or M3 is continuously employed by power controller 302 until operation power source voltage $V_{CC3}$ exceeds 20V, and operation mode M2 is continuously employed until operation power source voltage $V_{CC3}$ is below 12V. As a result, control method 502 can substantially maintain operation power source voltage $V_{CC3}$ within the range between 12V and 20V.

Figure 6:
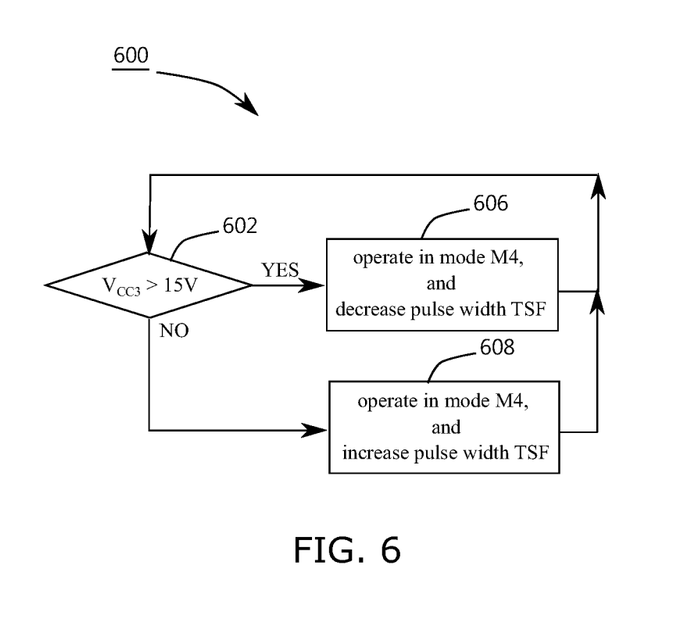

According to some embodiments of the invention, power controller 302 can employ operation mode M4 to subtly control operation power source voltage $V_{CC3}$. FIG. 6 shows control method 600 in use of power controller 302, where control signal SF, used as a pulse-width-modulation signal, controls chopper switch SWF to regulate operation power source voltage $V_{CC3}$ at 15V for example. At step 602, power controller 302 compares operation power source voltage $V_{CC3}$ with 15V. Step 606 follows step 602 if operation power source voltage $V_{CC3}$ exceeds 15V, operating power controller 302 in operation mode M4 and decreasing pulse width TSF of control signal SF, so as to reduce the power supplied to capacitor CVCC3. Step 608 follows step 602 if operation power source voltage $V_{CC3}$ is below 15V, operating power controller 302 in operation mode M4 and increasing pulse width TSF of control signal SF, so as to increase the power supplied to capacitor CVCC3. Control method 600 can subtly regulate operation power source voltage $V_{CC3}$ at 15V.

Both control methods 500 and 600 as shown in FIGS. 5 and 6 can maintain operation power source voltage $V_{CC3}$ below 20V, which is the highest voltage that power controller 302 needs to withstand. Probably, power controller 302 can be produced by a less expensive manufacturing process that is specially designed for products withstanding only 20V.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method in use of a flyback power converter comprising a main power switch and a transformer with a primary winding and an auxiliary winding, wherein the main power switch and the primary winding are connected in series, and a chopper switch and a buffer inductor are connected in series between the auxiliary winding and a power controller controlling the power switch and the chopper switch, the control method comprising:
    turning ON the main power switch for an ON time to energize the transformer; and
    turning ON the chopper switch for at least a time period during the ON time, so that during the time period the buffer inductor conducts an induced current flowing from the auxiliary winding and through the chopper switch, to charge a capacitor that supplies power to the power controller.

2. The control method as claimed in claim 1, wherein a freewheeling diode is connected between an input ground line and a joint that connects the chopper switch and the buffer inductor, the buffer inductor is energized during the time period, and the induced current that buffer inductor conducts flows from the freewheeling diode to the capacitor after the time period.

3. The control method as claimed in claim 1, comprising:
    controlling the chopper switch in response to an operation power source voltage on the capacitor.

4. The control method as claimed in claim 3, comprising:
    comparing the operation power source voltage with a first predetermined voltage;

comparing the operation power source voltage with a second predetermined voltage lower than the first predetermined voltage;

constantly turning OFF the chopper switch to stop charging the capacitor when the operation power source voltage exceeds the first predetermined voltage; and constantly turning ON the chopper switch during the ON time when the operation power source voltage is below the second predetermined voltage.

5. The control method as claimed in claim 4, comprising constantly turning ON the chopper switch a whole switching cycle of the main power switch when the operation power source voltage is below the second predetermined voltage.

6. The control method as claimed in claim 3, comprising:

providing a pulse-width-modulation signal to the chopper switch to regulate the operation power source voltage at a predetermined value.

7. The control method as claimed in claim 1, wherein the flyback power converter comprises a rectifier diode and the chopper switch connected in series between the buffer inductor and the auxiliary winding, and the induced current flows from the auxiliary winding, through the rectifier diode and the chopper switch, and to the capacitor.

8. A flyback power converter, comprising:

a transformer with a primary winding, a secondary winding, and an auxiliary winding, wherein the auxiliary winding has a first negative terminal connected to an input ground line;

a main power switch, connected in series with the primary winding between the input power line and the input ground line, wherein the primary winding has a second positive terminal connected to an input power line;

a power controller controlling the main power switch;

a capacitor supplying power to the power controller; and a rectifier diode, a chopper switch and a buffer inductor, connected in series between a first positive terminal of the auxiliary winding and the capacitor.

9. The flyback power converter as claimed in claim 8, further comprising a freewheeling diode connected between the input ground line and a joint that connects the chopper switch and the buffer inductor.

10. The flyback power converter as claim in claim 8, wherein the power controller turns ON the main power switch for an ON time, and turns ON the chopper switch for at least a time period within the ON time, so that the buffer inductor conducts an induced current during the time period from the auxiliary winding to charge the capacitor.

11. The flyback power converter as claim in claim 8, wherein the power controller controls the chopper switch in response to an operation power source voltage on the capacitor.

12. The flyback power converter as claim in claim 11, wherein the power controller compares the operation power source voltage with a first predetermined voltage and a second predetermined voltage lower than the first predetermined voltage, turns OFF the chopper switch constantly to stop charging the capacitor when the operation power source voltage exceeds the first predetermined voltage, and turning ON the chopper switch constantly during the ON time when the operation power source voltage is below the second predetermined voltage.

13. The flyback power converter as claim in claim 12, wherein the power controller turns ON the chopper switch constantly during a whole switching cycle of the main power switch when the operation power source voltage is below the second predetermined voltage.

14. The flyback power converter as claim in claim 12, wherein the power controller modulates a pulse width of a pulse-width-modulation signal sent to the chopper switch, to regulate the operation power source voltage.

* * * * *